(12) United States Patent
Kim et al.

(10) Patent No.: US 11,363,189 B2
(45) Date of Patent: Jun. 14, 2022

(54) APPARATUS AND METHOD FOR RECOGNIZING VOICE AND FACE ON BASIS OF CHANGE IN CAMERA DRIVING METHOD

(71) Applicant: Samsung Electronics Co., Ltd., Suwon-si (KR)

(72) Inventors: Hyungeun Kim, Suwon-si (KR); Suckho Seo, Suwon-si (KR); Soonhee Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/967,716

(22) PCT Filed: Jan. 28, 2019

(86) PCT No.: PCT/KR2019/001165
§ 371 (c)(1),
(2) Date: Aug. 5, 2020

(87) PCT Pub. No.: WO2019/151734
PCT Pub. Date: Aug. 8, 2019

(65) Prior Publication Data
US 2021/0044739 A1 Feb. 11, 2021

(30) Foreign Application Priority Data

Feb. 5, 2018 (KR) ........................ 10-2018-0014117

(51) Int. Cl.
*H04N 5/225* (2006.01)
*H04N 5/232* (2006.01)
(Continued)

(52) U.S. Cl.
CPC .......... *H04N 5/23219* (2013.01); *G06T 7/20* (2013.01); *G06V 40/161* (2022.01); *G10L 15/22* (2013.01);
(Continued)

(58) Field of Classification Search
None
See application file for complete search history.

(56) References Cited

U.S. PATENT DOCUMENTS 9,043,025 B2 5/2015 Brooks et al.
2009/0028386 A1 1/2009 Michimoto et al.
(Continued)

FOREIGN PATENT DOCUMENTS

| JP | 2007-208453 A | 8/2007 |
| KR | 10-1460463 B1 | 11/2014 |
| KR | 10-1741661 B1 | 5/2017 |

OTHER PUBLICATIONS

International Search Report dated May 10, 2019 in connection with International Patent Application No. PCT/KR2019/001165, 3 pages.
(Continued)

*Primary Examiner* — Eileen M Adams

(57) ABSTRACT

Various embodiments related to an electronic device are disclosed, and an electronic device according to one embodiment comprises: a camera; at least one microphone; at least one motor for rotating the camera around at least one axis; and at least one processor, wherein the processor can be configured to: receive a voice through at least one microphone and an image through the camera; perform a first control on at least one motor on the basis of at least a first motor control mode; use at least one motor on the basis of at least the first control so as to perform first face tracking using the received image; perform a second control on at least one motor on the basis of a second motor control mode during the first tracking; and perform voice recognition or
(Continued)

face recognition by using at least one motor on the basis of at least the second control. Other various embodiments are possible.

11 Claims, 14 Drawing Sheets

(51) Int. Cl.
*G06T 7/20* (2017.01)
*G10L 15/22* (2006.01)
*H04R 1/08* (2006.01)
*G06V 40/16* (2022.01)

(52) U.S. Cl.
CPC .......... *H04N 5/23299* (2018.08); *H04R 1/08* (2013.01); *G06T 2207/30201* (2013.01); *G10L 2015/223* (2013.01); *H04R 2499/11* (2013.01)

(56) References Cited

U.S. PATENT DOCUMENTS

| | | | |
|---|---|---|---|
| 2009/0041355 A1* | 2/2009 | Sakaji | ................ H04N 5/23219 382/190 |
| 2013/0214718 A1 | 8/2013 | Ikeda et al. | |
| 2013/0329003 A1* | 12/2013 | Hsia | ................... H04N 5/23238 348/36 |
| 2013/0342652 A1 | 12/2013 | Kikkeri et al. | |
| 2015/0224640 A1* | 8/2015 | Vu | ........................... B25J 5/007 700/259 |
| 2016/0352992 A1* | 12/2016 | Saika | ................... F16M 11/041 |
| 2017/0230580 A1* | 8/2017 | Ohara | ................ H04N 5/23245 |

OTHER PUBLICATIONS

Written Opinion of the International Searching Authority dated May 10, 2019 in connection with International Patent Application No. PCT/KR2019/001165, 5 pages.

* cited by examiner

APPARATUS AND METHOD FOR RECOGNIZING VOICE AND FACE ON BASIS OF CHANGE IN CAMERA DRIVING METHOD

CROSS-REFERENCE TO RELATED APPLICATIONS

This application is a 371 of International Application No. PCT/KR2019/001165 filed on Jan. 28, 2019, which claims priority to Korean Patent Application No. 10-2018-0014117 filed on Feb. 5, 2018 in the Korean Intellectual Property Office, the disclosures of which are herein incorporated by reference in their entirety.

1. FIELD

Various embodiments of the disclosure relate to an apparatus and method for voice and face recognition.

2. DESCRIPTION OF RELATED ART

The Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT and Big Data processing technology through connection with a cloud server. As sensing technology, wired/wireless communication and network infrastructures, service interface technology, security technology, etc., have been demanded for IoT network implementation, a sensor network, machine to machine (M2M) communication, machine type communication (MTC), and so forth have been recently researched for connection between things. Such an IoT environment may provide intelligent Internet technology (IT) services that create new value in human life by collecting and analyzing data generated among connected objects. The IoT network may be applied to a variety of fields including smart homes, smart buildings, smart cities, smart cars or connected cars, smart grids, health care, smart appliances, advanced medical services, and so forth through convergence and combination between existing IT and various industries. The IoT network may be used to connect various electronic devices and remotely control the connected electronic devices. For example, a user may perform a function using various objects connected through the IoT network, by using an electronic device including a processor and a communication interface.

The electronic device may recognize a voice and a face based on a voice signal received through a microphone and a user image captured by a camera, and perform a function corresponding to voice and face recognition. For example, at home, there may be various objects such as a plurality of lightings, a plurality of audio devices, or a plurality of displays, and the electronic device may recognize a voice and a face based on the voice signal received through the microphone and the user image captured by the camera, and upon receiving a voice command such as "Turn on the light" from the user with a specific face as a result of recognition, the electronic device may perform a function of controlling a lamp among the various objects connected to the IoT network to be turned on.

An electronic device may perform face tracking that involves photographing along a user's face by using a camera in voice and face recognition. While performing face tracking, the electronic device may recognize the user's face and recognize a voice signal corresponding to the user's face among signals received through the microphone. The electronic device may perform face tracking while rotating or moving itself by using at least one motor, or may perform face tracking while rotating or moving the camera or a component including the camera.

When the electronic device recognizes the voice and the face while performing face tracking, noise and vibration may be generated by the motor operating to rotate or move the electronic device or the camera. The noise caused by the motor may be received together with a voice signal uttered from the user through the microphone, and the noise caused by the motor may be included in the signal received through the microphone, degrading performance of voice recognition. The vibration caused by the motor may shake the camera, causing a blow phenomenon in the image captured by the camera and thus degrading the performance of voice recognition.

Various embodiments of the present disclosure may provide an apparatus and method for voice and face recognition based on a change of a camera driving method, in which noise and vibration of a motor, caused by face tracking, may be reduced in voice and face recognition.

Various embodiments of the present disclosure may also provide an apparatus and method for voice and face recognition based on a change of a camera driving method, in which a face is detected through face tracking based on a first motor control mode and upon detection of the face, voice and face recognition is performed through face tracking based on a second motor control mode where less noise and vibration of a motor are generated than in the first motor control mode, thereby improving the performance of voice and face recognition.

SUMMARY

According to various embodiments, an electronic device includes a camera, at least one microphone, at least one motor rotating the camera with respect to at least one axis, and at least one processor, in which the at least one processor is configured to receive a voice through the at least one microphone and an image through the camera, to perform first control on the at least one motor at least based on a first motor control mode and perform first face tracking using the received image by using the at least one motor at least based on the first control, and to perform second control on the at least one motor based on a second motor control mode while performing the first face tracking, and perform voice recognition or face recognition by using the at least one motor at least based on the second control.

According to various embodiments, a method for voice recognition or face recognition in an electronic device includes receiving a voice through at least one microphone and an image through a camera, performing first control on at least one motor at least based on a first motor control mode and performing first face tracking using a received image by using the at least one motor at least based on the first control, and performing second control on the at least one motor based on a second motor control mode while performing the first face tracking, and performing voice recognition or face recognition by using the at least one motor at least based on the second control.

According to various embodiments, in a storage medium having stored therein instructions which cause, when executed by at least one circuit, the at least one circuit to perform at least one operation, the at least one operation includes receiving a voice through at least one microphone and an image through a camera, performing first control on at least one motor at least based on a first motor control mode and performing first face tracking using a received image by using the at least one motor at least based on the first control, and performing second control on the at least one motor at least based on a second motor control mode while performing the first face tracking, and performing voice recognition or face recognition by using the at least one motor at least based on the second control.

According to various embodiments of the present disclosure, in an electronic device, a face may be detected through face tracking based on a first motor control mode and upon detection of the face, voice and face recognition may be performed through a face tracking mode based on a second motor control mode where less noise and vibration of a motor are generated than in the first motor control mode, thereby improving the performance of voice and face recognition.

According to various embodiments of the present disclosure, in the electronic device, when voice and face recognition fails through the face tracking mode based on the second motor control mode, voice and face recognition may be performed through a face tracking mode based on a third motor control mode where less noise and vibration of a motor are generated than in the second motor control mode, thereby improving the performance of voice and face recognition.

DETAILED DESCRIPTION

Figure 1:
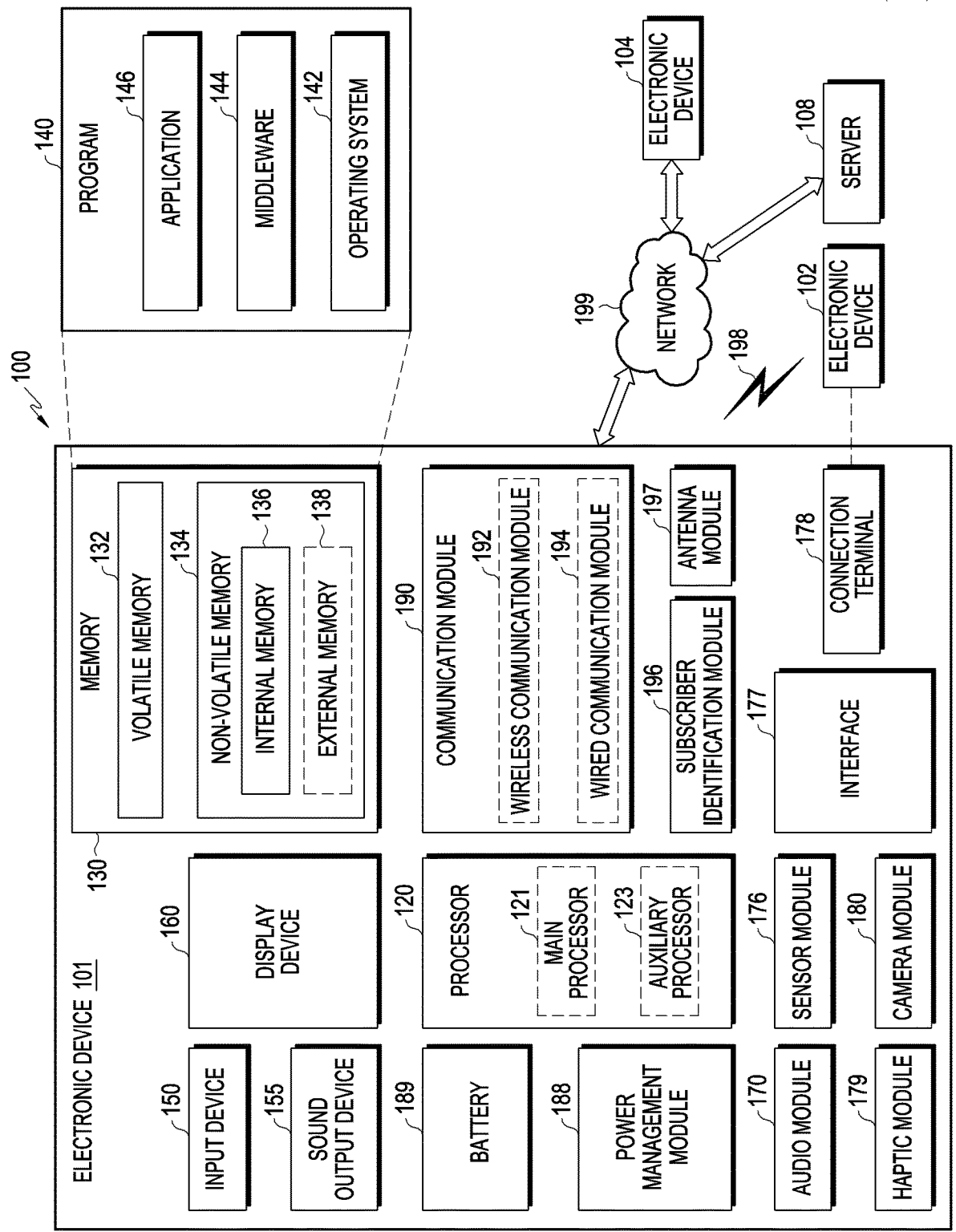
FIG. 1 illustrates an electronic device and an external electronic device to recognize a voice and a face by adaptively changing a camera driving method, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

Figure 2A:
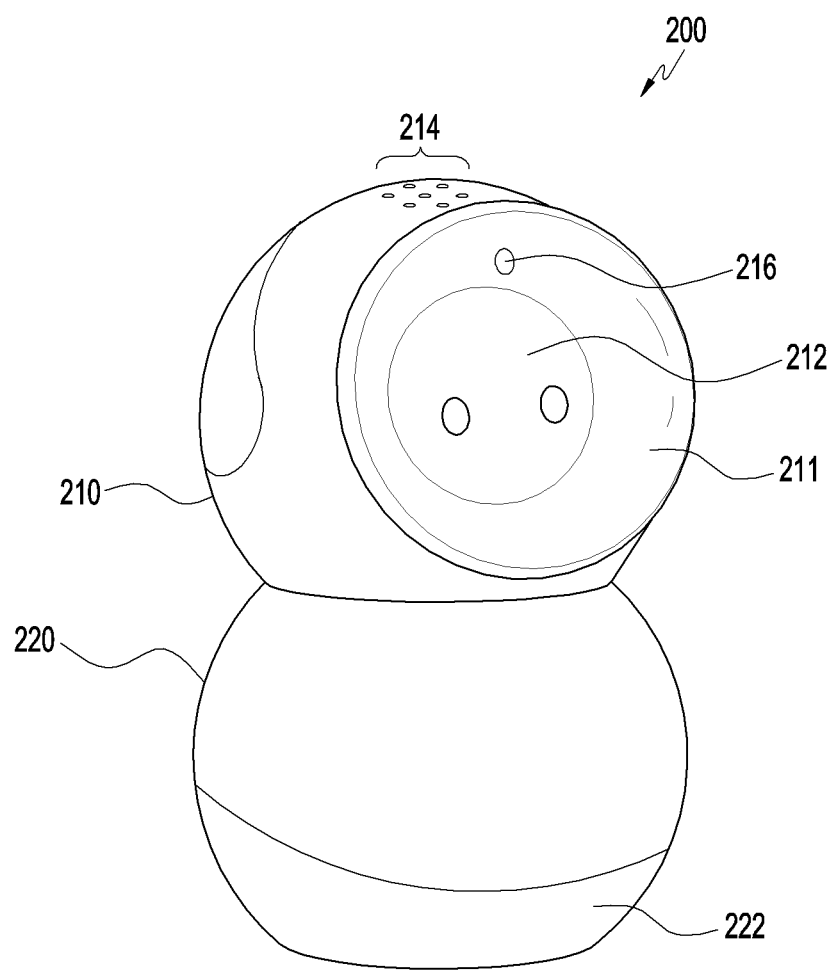
FIGS. 2A and 2B are perspective views of an electronic device according to various embodiments.
Figure 2B:
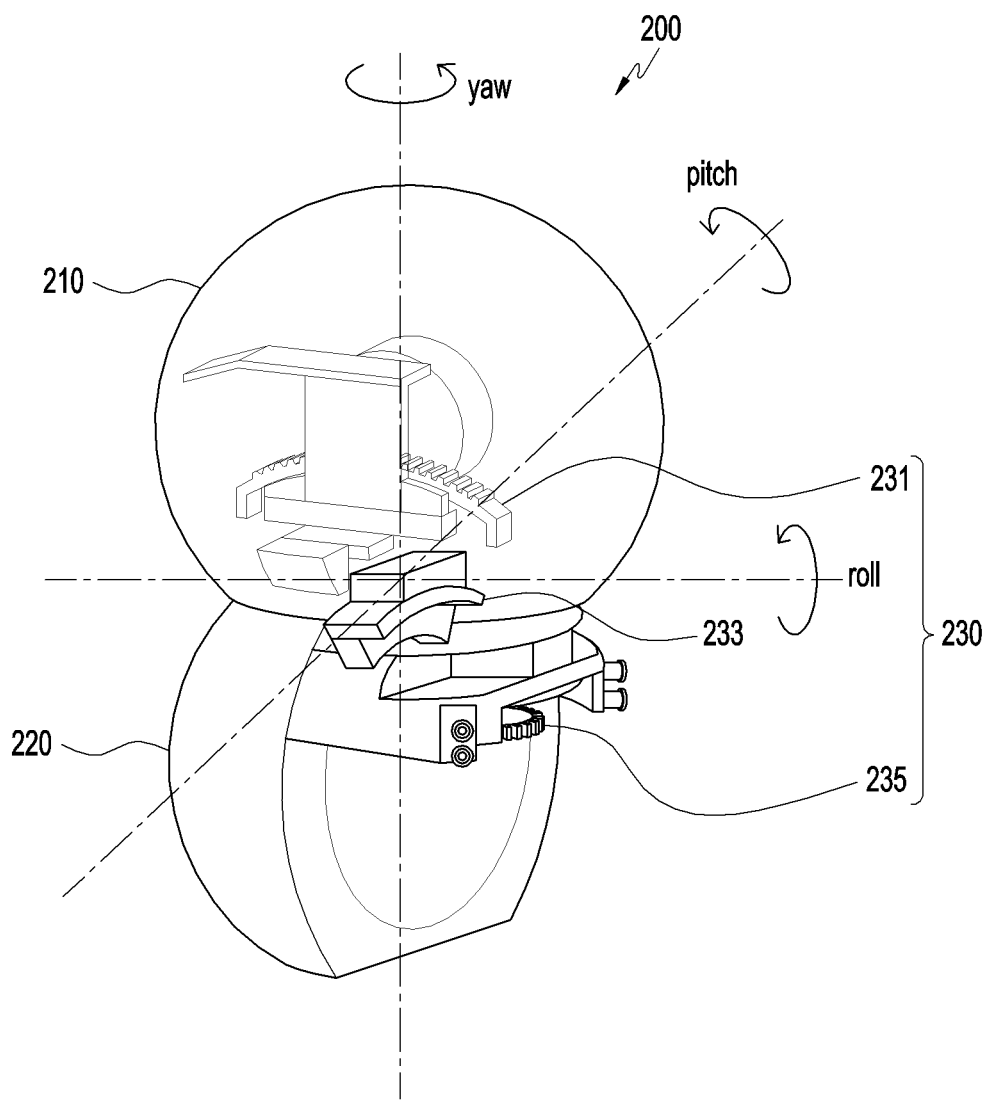

FIGS. 2A and 2B are perspective views of an electronic device according to various embodiments.

Referring to FIGS. 2A and 2B, an electronic device 200 (e.g., the electronic device 100 of FIG. 1) may be implemented in the form of a robot. The electronic device 200 may include a head part 210 and a body part 220. The head part 210 may be arranged on an upper portion of the body part 220. The head part 210 and the body part 220 may be implemented in a shape corresponding to a head and a body of a person in an embodiment. According to various embodiments, a front cover 211, a display 212, a microphone 214, a camera 216, a speaker 222, and a motor 230 may be included in at least a portion of the head part 210 or the body part 220.

Referring to FIG. 2A, the front cover 211 may be arranged at a position corresponding to a shape of a face of a person, and may include a transparent material or a semi-transparent material. The front cover 211 may be an element capable of displaying an arbitrary screen, and in this case, the front cover 211 and the display 212 may be implemented with single hardware (H/W). The front cover 211 may be at least one of various sensors for image sensing, mechanical eye structure, and display for outputting a screen in a form indicating a direction for interaction with the user, or may indicate the direction through a light or a temporary tool change or may include at least one H/W or tool structure directed to the user in interaction with the user in a form that does not identify the direction.

The display 212 may be arranged inside the front cover 211 to correspond to the front cover 211. The display 212 may include a touch screen, and receive a touch, a gesture, proximity, or a hovering input, for example, by using an electronic pen or a part of a body of a user.

The microphone 214 may be arranged in at least a part of a top face of the head part 210, and may include one microphone or a plurality of microphones. For example, the microphone 214 may include seven microphones as the plurality of microphones. When the microphone 214 includes the plurality of microphones, the electronic device 200 may selectively receive a voice signal through at least one microphone corresponding to a user's direction among the plurality of microphones.

The camera 216 may photograph an external environment. The electronic device 200 may identify the user or another electronic device by using at least one image obtained through the camera 216. According to an embodiment, the electronic device 200 may detect the user's face based on the at least one image obtained through the camera 216, and recognize the detected face. For example, the electronic device 200 may identify the user of the detected face. According to an embodiment, the electronic device 200 may identify a position or movement of the user or relative positions or movement of other electronic devices. According to an embodiment, the camera 216 may perform face tracking that involves photographing along the user's face.

The speaker 222 may output a sound corresponding to data generated in the electronic device 200. According to various embodiments, at least a part of the head part 210 and the body part 220 may further include a sensor, a communication interface, a memory, and a processor.

Referring to FIG. 2B, the motor 230 may include at least one motor. The electronic device 200 may move the head part 210 through the at least one motor and change a direction in which a front face of the head part 210 is directed. According to various embodiments, the at least one motor may operate such that the head part 210 rotates with respect to at least one axis. According to various embodiments, the at least one motor may include a first motor 231, a second motor 233, and a third motor 235. The first motor 231 may operate to cause the head part 210 to rotate with respect to a pitch axis, the second motor 233 may operate to cause the head part 210 to rotate with respect to a roll axis, and the third motor 235 may operate to cause the head part 210 to rotate with respect to a yaw axis. For example, when the head part 210 rotates with respect to the pitch axis, the head part 210 may move as if a head of a person moves to the left or to the right in a front direction; when the head part 210 rotates with respect to the roll axis, the head part 210 may move as if the head of the person moves back and forth in the front direction; when the head part 210 rotates with respect to the yaw axis, the head part 210 may move as if the head of the person is turned.

According to various embodiments, the electronic device 200 implemented in the form of a robot is simply an example, and an implementation form thereof is not limited specially. For example, the electronic device 200 may be implemented as a standalone type formed with one robot entity. The electronic device 200 may be implemented as a docking station type that fixes a tablet personal computer (PC) or a smart phone. The electronic device 200 may be classified into a fixed type and a mobile type depending on mobility, in which the mobile type may include a mobile type using a wheel, a mobile type using a caterpillar, a mobile type using leg movement (including two foot or four foot), and a flying mobile type.

According to various embodiments, an electronic device (e.g., the electronic device 100 of FIG. 1 or the electronic device 200 of FIGS. 2A and 2B) includes a camera (e.g., the camera module 180 of FIG. 1 or the camera 216 of FIG. 2), at least one microphone (e.g., the input device 150 of FIG. 1 or the microphone 214 of FIG. 2), at least one motor rotating the camera with respect to at least one axis, and at least one processor, in which the at least one processor is configured to receive a voice through the at least one microphone and an image through the camera, to perform first control on the at least one motor at least based on a first motor control mode and perform first face tracking using the received image by using the at least one motor at least based on the first control, and to perform second control on the at least one motor based on a second motor control mode while performing the first face tracking, and perform voice recognition or face recognition by using the at least one motor at least based on the second control.

According to various embodiments, the processor may be configured to perform the second control on the at least one motor based on the second motor control mode in a voice recognition period or a face recognition period while performing the first face tracking. According to various embodiments, the processor may be further configured to perform third control on the at least one motor based on a third motor control mode and further perform the voice recognition or the face recognition by using the at least one motor at least based on the third control, when the voice recognition or the face recognition fails.

According to various embodiments, the processor may be configured to perform a function designated in association with a recognized voice or a recognized face, when the voice recognition or the face recognition is successful.

According to various embodiments, the processor may be configured to perform the first face tracking when a designated voice signal is received through the at least one microphone.

According to various embodiments, the processor may be configured to perform the first face tracking based on a face that is closer to a center region of the received image among a plurality of faces, when there is a plurality of faces for the first face tracking.

According to various embodiments, the first motor control mode may include a mode in which the at least one motor is configured to rotate the camera at a first speed with respect to at least one axis, the second motor control mode may include a mode in which the at least one motor is configured to rotate the camera at a second speed with respect to the at least one axis, and the third motor control mode may include a mode in which the at least one motor is configured to rotate the camera at a third speed with respect to the at least one axis.

According to various embodiments, the second speed may be lower than the first speed, and the third speed may be lower than the second speed.

According to various embodiments, the electronic device may further include at least one filter connected between the at least one motor and the processor, and the processor may be configured to adjust a frequency of the at least one filter to a first frequency according to the first motor control mode through the at least one filter, to adjust the frequency of the at least one filter to a second frequency to correspond to the second motor control mode, or to adjust the frequency of the at least one filter to a third frequency to correspond to the third motor control mode.

According to various embodiments, the at least one motor may include a first motor, a second motor, and a third motor, and the at least one filter may include a first filter, a second filter, and a third filter, and the processor may be configured to adjust a threshold frequency of each of the first filter, the second filter, and the third filter to a first frequency according to the first motor control mode, to adjust the frequency of each of the first filter, the second filter, and the third filter to a second frequency to correspond to the second motor control mode, or to adjust the frequency of each of the first filter, the second filter, and the third filter to a third frequency to correspond to the third motor control mode.

According to various embodiments, the at least one motor may include a first motor, a second motor, and a third motor, and the first motor may operate to rotate the camera with respect to a pitch axis, the second may operate to rotate the camera with respect to a roll axis, and the third motor may operate to rotate the camera with respect to a yaw axis.

Figure 3:
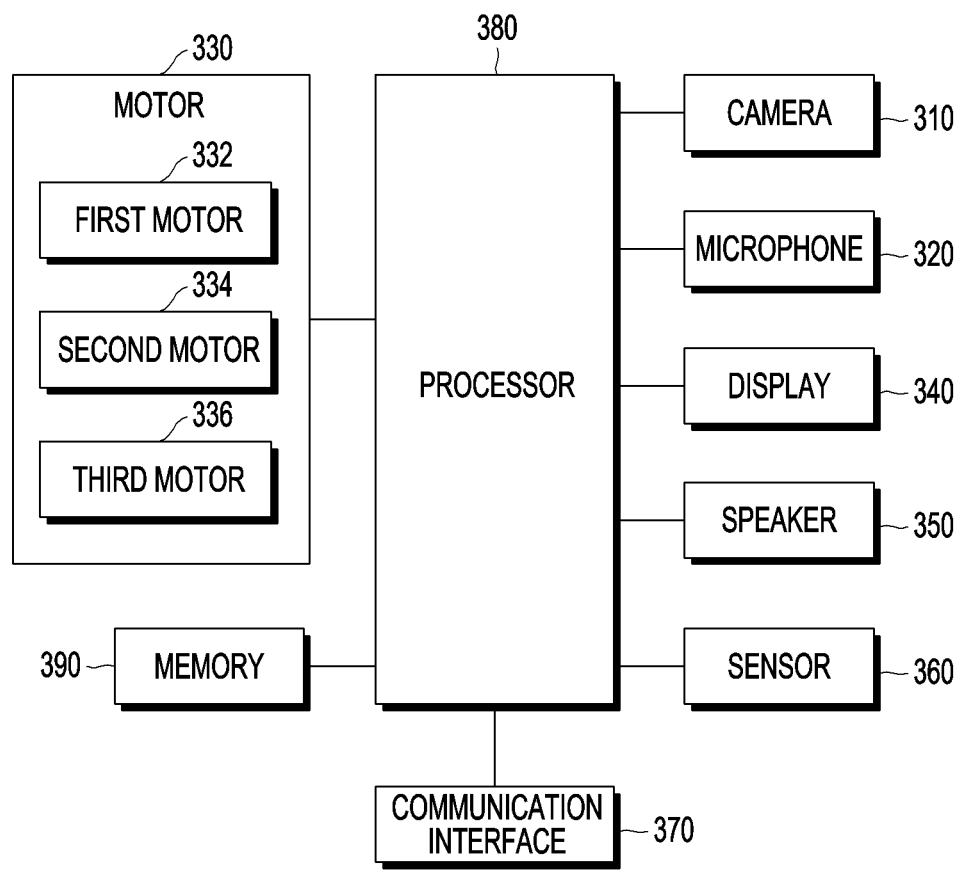
FIG. 3 is a block diagram of an electronic device according to various embodiments.

FIG. 3 is a block diagram of an electronic device according to various embodiments.

Referring to FIG. 3, an electronic device 300 (e.g., the electronic device 100 of FIG. 1 or the electronic device 200 of FIGS. 2A and 2B) may include a microphone 320, a motor 330, a display 340, a speaker 350, a sensor 360, a communication interface 370, a processor 380, and a memory 390.

The camera 310 (e.g., the camera module 180 of FIG. 1 or the camera 216 of FIG. 2) may photograph the external environment. The camera 310 may provide a captured image to the processor 380.

The microphone 320 (e.g., the input device 150 of FIG. 1 or the microphone 214 of FIG. 2) may include one microphone or a plurality of microphones. The microphone or each of the plurality of microphones may receive a voice signal and provide the same to the processor 380. For example, the microphone 320 may include seven microphones as the plurality of microphones. When the microphone 320 includes the plurality of microphones, at least some microphone corresponding to the user's direction among the plurality of microphones may receive a voice signal and provide the same to the processor 380.

The motor 330 (e.g., the motor 230 of FIG. 2) may include at least one motor. According to various embodiments, the at least one motor may include a first motor 332, a second motor 334, and a third motor 336. Each of the first motor 332, the second motor 334, and the third motor 336 may operate according to a control signal of the processor 380.

According to an embodiment, the first motor 332 may operate to cause the camera 310 or a head part (e.g., the head part 210 of FIG. 2) including the camera 310 to rotate with respect to the pitch axis, the second motor 332 may operate to cause the camera 310 or the head part including the camera 310 to rotate with respect to the roll axis, and the third motor 336 may operate to cause the camera 310 or the head part including the camera 310 to rotate with respect to the yaw axis. For example, when the camera 310 or the head part including the camera 310 rotates with respect to the pitch axis, the camera 310 or the head part including the camera 310 may move as if the person's head moves to the left or to the right in the front direction; when the camera 310 or the head part including the camera 310 rotates with respect to the roll axis, the head part may move as if the person's head moves back and forth in the front direction; when the camera 310 or the head part including the camera 310 rotates with respect to the yaw axis, the head part may move as if the head of the person is turned.

According to various embodiments, each of the first motor 332, the second motor 334, and the third motor 336 may operate in any one of a first motor control mode, a second motor control mode, and a third motor control mode, under control of the processor 380.

According to an embodiment, the first motor control mode may be a mode for controlling each of the first motor 332, the second motor 334, and the third motor 336 to cause the camera 310 or the head part including the camera 310 to rotate with respect to the pitch axis, the roll axis, and the yaw axis based on a first speed. For example, the first speed may be 200 degrees/sec with respect to the roll axis, 200 degrees/sec with respect to the yaw axis, and 20 degrees/sec with respect to the pitch axis. The first speed may be designated as a speed that is different from each of the aforementioned pitch axis, roll axis, and yaw axis.

According to an embodiment, the second motor control mode may be a mode for controlling each of the first motor 332, the second motor 334, and the third motor 336 to cause the camera 310 or the head part including the camera 310 to rotate with respect to the pitch axis, the roll axis, and the yaw axis based on a second speed that is lower than the first speed.

According to an embodiment, the third motor control mode may be a mode for controlling each of the first motor 332, the second motor 334, and the third motor 336 to cause the camera 310 or the head part including the camera 310 to rotate with respect to the pitch axis, the roll axis, and the yaw axis based on a third speed that is lower than the second speed.

The display 340 (e.g., the display 160 of FIG. 1 or the display 212 of FIG. 2) may include a touch screen, and receives a touch, a gesture, proximity, or a hovering input, for example, by using an electronic pen or a part of a body of a user. According to various embodiments, the display 340 may display various display data generated by the processor 380 on a screen.

The speaker 350 (e.g., the audio output device 155 of FIG. 1 or the speaker 222 of FIG. 2) may output a sound corresponding to data generated in the electronic device 200.

The sensor 360 (e.g., the sensor module 176 of FIG. 1) may include one sensor or two or more sensors, and may obtain at least one piece of information regarding the external environment. For example, the sensor 360 may sense proximity of the user or another electronic device to the electronic device 300. The sensor 360 may sense the proximity of the user or the other electronic device based on proximity information. Alternatively, the sensor 360 may sense the user's proximity based on a signal coming from an electronic device used by the user. Moreover, the sensor 360 may sense movement or a position of the user.

The communication interface 370 (e.g., the communication module 190 of FIG. 1) may receive various data from a transmission apparatus (e.g., the electronic device 102, the electronic device 104, or the server 108 of FIG. 1) and may transmit data generated in the electronic device 200 to a reception apparatus (e.g., the electronic device 102, the electronic device 104, or the server 108 of FIG. 1).

The electronic device 380 may identify the user or the other electronic device by using at least one image obtained through the camera 310. According to various embodiments, the electronic device 300 may detect the user's face based on the at least one image obtained through the camera 310, and recognize the detected face. According to an embodiment, the electronic device 300 may detect the user's face and perform face tracking, based on the at least one image obtained through the camera 310, and perform face recognition while performing face tracking. For example, face recognition may include identifying the user of the detected face. For example, the processor 380 may identify the user of the detected face by using at least one user face data stored in the memory 390. According to an embodiment, the electronic device 300 may identify a position or movement of the user or may further identify relative positions or movement of other electronic devices. The processor 380 may receive a voice signal that is input through the microphone 320. According to various embodiments, when the microphone 320 includes a plurality of microphones, the processor 380 may receive a voice signal that is input through at least some microphones corresponding to a user's direction among the plurality of microphones.

The processor 380 may control the camera 310 to perform photographing along the user's face, thus performing face tracking based on captured facial images. The processor 380 may recognize the user's face while performing face tracking, and recognize a voice corresponding to the user's face among signals received through the microphone 320. The processor 380 may rotate the camera 310 or the head part including the camera 310 to rotate with respect to one axis by using the motor 330 to cause the camera 310 to perform photographing along the user's face, or move the camera 310 or the head part including the camera 310 by using the motor 330 to cause the camera 310 to perform photographing along the user's face.

According to various embodiments, the processor 380 may determine whether to wake up based on a voice signal received through the microphone 320, receive a voice through the microphone 320 and an image through the camera 310 when waking up, and perform face tracking through control over the motor 330 based on the first motor control mode. The processor 380 may perform voice recognition or face recognition while controlling the motor 330 based on the second motor control mode in a voice recognition or face recognition period during face tracking. The processor 380 may perform voice recognition or face recognition while controlling the motor 330 based on the third motor control mode when voice recognition or face recognition based on the second motor control mode fails.

According to various embodiments, the first motor control mode may be a mode in which each of the first motor 332, the second motor 334, and the third motor 336 rotates the camera 310 or the head part including the camera 310 with respect to at least one axis based on a first speed, the second motor control mode may be a mode in which each of the first motor 332, the second motor 334, and the third motor 336 rotates the camera 310 or the head part including the camera 310 with respect to at least one axis based on a second speed, and the third motor control mode may be a mode in which each of the first motor 332, the second motor 334, and the third motor 336 rotates the camera 310 or the head part including the camera 310 with respect to at least one axis based on a third speed. For example, the second speed may be lower than the first speed, and the third speed may be lower than the second speed. The processor 380 may perform a function related to a recognized voice or face when voice recognition or face recognition is successful. For example, when the processor 380 receives a voice command such as "Turn on the light" as a voice recognition result, the electronic device may perform a function of controlling a lamp among various objects connected to the IoT network to be turned on. For example, the processor 380 may identify the user corresponding to a face recognition result and perform a function of providing information of the identified user to an external server. According to an embodiment, the external server may update user information for which the electronic device is performing face tracking, based on user information received from the electronic device, or obtain information related to the user for which the electronic device is performing face tracking and deliver the obtained information to the electronic device.

The memory 390 may store instructions and related data for operating the processor 380. The memory 390 may store a voice database required for voice recognition and at least one user face database required for face recognition. For example, the processor 380 may perform face recognition by comparing faces registered in an input image database through an algorithm such as scale invariant feature transform (SIFT), speeded up robust features (SURF), etc.

According to various embodiments, a method for voice recognition or face recognition in an electronic device (e.g., the electronic device 100 of FIG. 1 or the electronic device 200 of FIGS. 2A and 2B) includes receiving a voice through at least one microphone (e.g., the input device 150 of FIG. 1 or the microphone 214 of FIG. 2) and an image through a camera (e.g., the camera module 180 of FIG. 1 or the camera 216 of FIG. 2), performing first control on at least one motor (e.g., the motor 230 of FIG. 2 or the motor 330 of FIG. 3) at least based on a first motor control mode and performing first face tracking using a received image by using the at least one motor at least based on the first control, and performing second control on the at least one motor based on a second motor control mode while performing the first face tracking, and performing voice recognition or face recognition by using the at least one motor at least based on the second control.

According to various embodiments, the method may further include performing the second control on the at least one motor based on the second motor control mode in a voice recognition period or a face recognition period while performing the first face tracking.

According to various embodiments, the method may further include performing third control on the at least one motor based on a third motor control mode and further performing the voice recognition or the face recognition by using the at least one motor at least based on the third control, when the voice recognition or the face recognition fails.

According to various embodiments, the method may further include performing a function designated in association with a recognized voice or a recognized face, when the voice recognition or the face recognition is successful.

According to various embodiments, the method may further include performing the first face tracking when a designated voice signal is received through the at least one microphone.

According to various embodiments, the method may further include performing the first face tracking based on a face that is closer to a center region of the received image among a plurality of faces, when there is a plurality of faces for the first face tracking.

According to various embodiments, the first motor control mode may include a mode in which the at least one motor is configured to rotate the camera at a first speed with respect to at least one axis, the second motor control mode may include a mode in which the at least one motor is configured to rotate the camera at a second speed with respect to the at least one axis, and the third motor control mode may include a mode in which the at least one motor is configured to rotate the camera at a third speed with respect to the at least one axis.

According to various embodiments, the method may further include adjusting a frequency of the at least one filter to a first frequency according to the first motor control mode through the at least one filter, adjusting the frequency of the at least one filter to a second frequency to correspond to the second motor control mode, or adjusting the frequency of the at least one filter to a third frequency to correspond to the third motor control mode.

According to various embodiments, the at least one motor may include a first motor, a second motor, and a third motor, and the at least one filter may include a first filter, a second filter, and a third filter, and the method may further include adjusting a threshold frequency of each of the first filter, the second filter, and the third filter to a first frequency according to the first motor control mode, adjusting the frequency of each of the first filter, the second filter, and the third filter to a second frequency to correspond to the second motor control mode, or adjusting the frequency of each of the first filter, the second filter, and the third filter to a third frequency to correspond to the third motor control mode.

According to various embodiments, the at least one motor may include a first motor, a second motor, and a third motor, and the first motor may operate to rotate the camera with respect to a pitch axis, the second may operate to rotate the camera with respect to a roll axis, and the third motor may operate to rotate the camera with respect to a yaw axis.

Figure 4A:
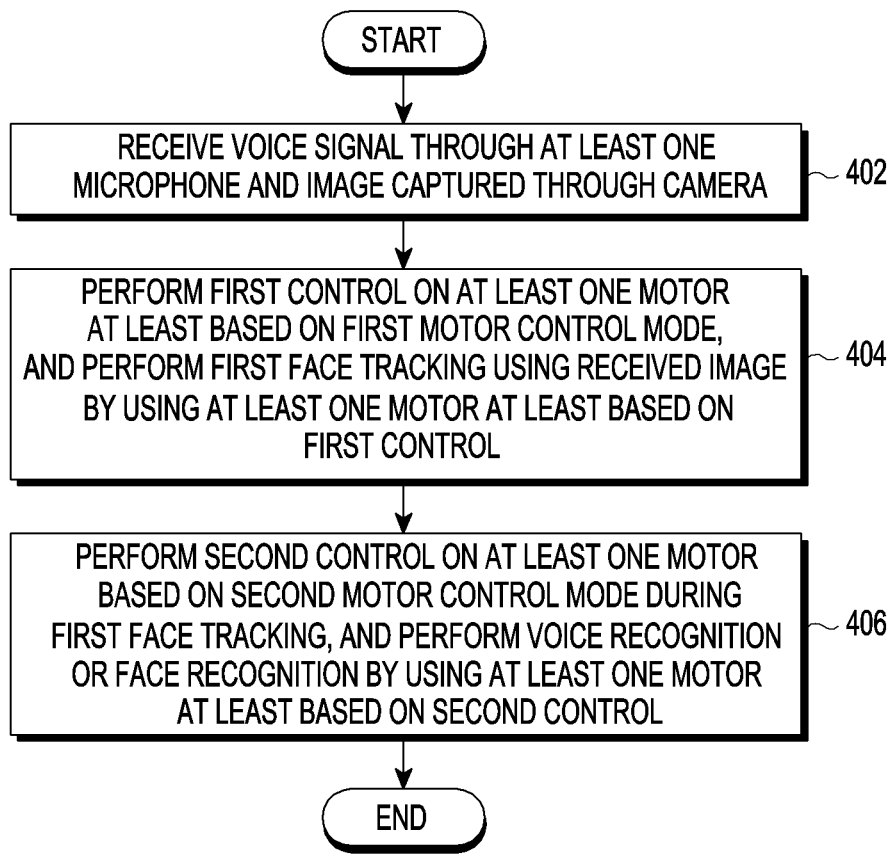
FIGS. 4A and 4B are flowcharts of a voice and face recognition method performed by an electronic device according to various embodiments.
Figure 4B:
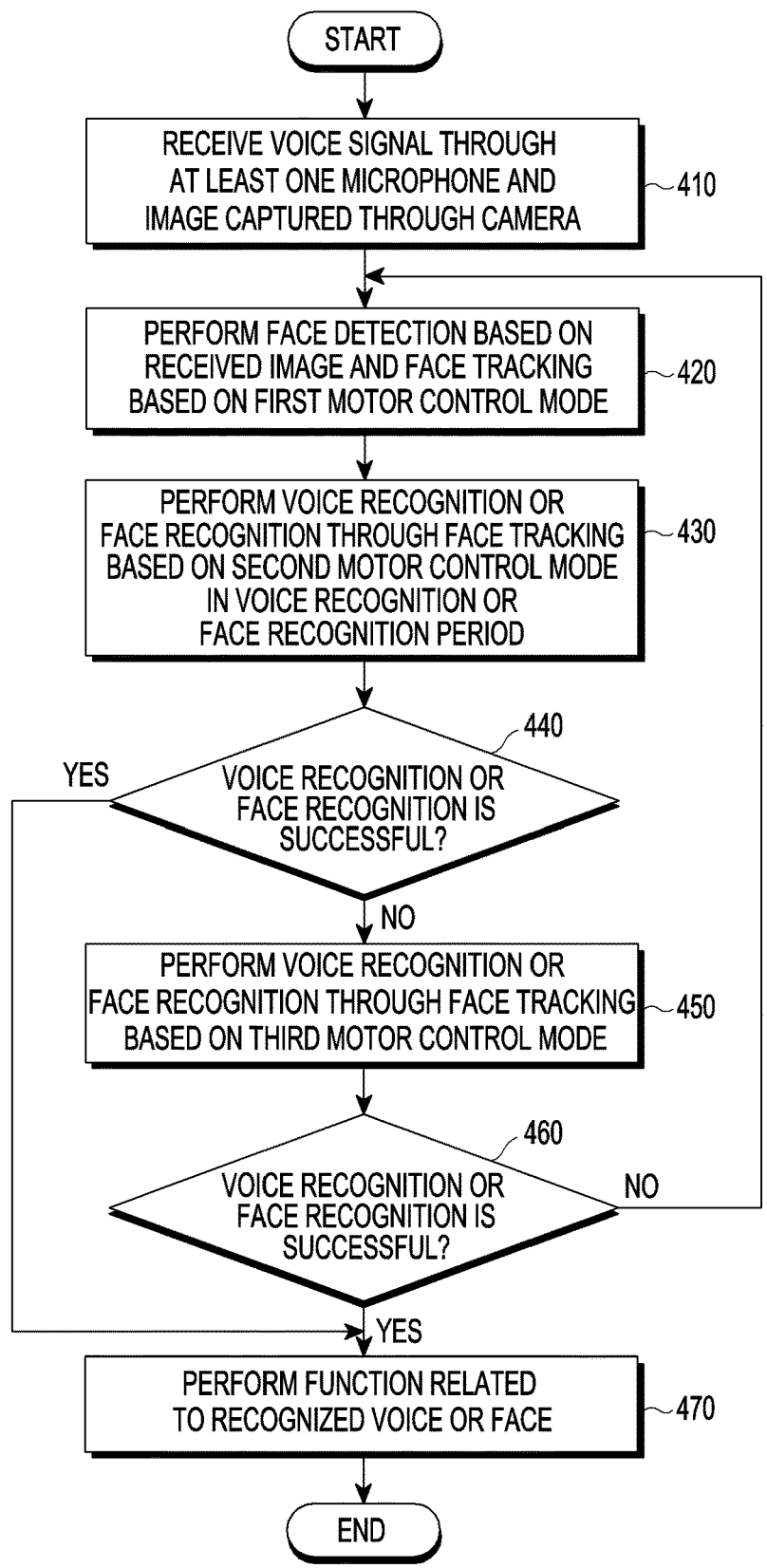

FIGS. 4A and 4B are flowcharts of a voice and face recognition method performed by an electronic device according to various embodiments.

Referring to FIG. 4A, a processor (e.g., the processor 120 of FIG. 1 or the processor 380 of FIG. 3, which will be hereinafter described using the processor 380 of FIG. 3 as an example) of the electronic device (e.g., the electronic device 100 of FIG. 1, the electronic device 200 of FIGS. 2A and 2B, or the electronic device 300 of FIG. 3) may receive a voice signal that is input through the microphone 320 and receive an image captured by the camera 330, in operation 402.

In operation 404, the processor 380 may perform first control on at least one motor at least based on the first motor control mode and perform first face tracking using an image received using at least one motor at least based on the first control. According to various embodiments, the processor 380 may perform first control on the motor 330 based on the first motor control mode to cause the camera 310 or the head part including the camera 310 to follow a face moving direction in an image captured by the camera 330 directed toward the received voice signal, and perform first face tracking to cause the camera 310 or the head part including the camera 310 to perform photographing along the face. For example, the processor 380 may cause the camera 310 or the head part including the camera 310 to perform photographing along the face based on the first speed at least based on the first control by using at least one of the first motor 332, the second motor 334, or the third motor 336.

In operation 406, the processor 380 may perform second control on at least one motor based on the second motor control mode during first face tracking and perform voice recognition or face recognition by using at least one motor at least based on second control. According to various embodiments, the processor 380 may perform voice recognition while performing second face tracking in which at least one of the first motor 332, the second motor 334, or the third motor 336 causes the camera 310 or the head part including the camera 310 to perform photographing along the face based on the second speed being lower than the first speed in a voice recognition period. The processor 380 may perform face recognition while performing second face tracking in which at least one of the first motor 332, the second motor 334, or the third motor 336 causes the camera 310 or the head part including the camera 310 to perform photographing along the face based on the second speed being lower than the first speed in a face recognition period.

Referring to FIG. 4B, a processor (e.g., the processor 120 of FIG. 1 or the processor 380 of FIG. 3, which will be hereinafter described using the processor 380 of FIG. 3 as an example) of the electronic device (e.g., the electronic device 100 of FIG. 1, the electronic device 200 of FIGS. 2A and 2B, or the electronic device 300 of FIG. 3) may receive a voice signal that is input through the microphone 320 and receive an image captured by the camera 330, in operation 410. According to various embodiments, the processor 380 may determine whether to wake up and may receive a voice through the microphone 320 and an image through the camera 310 when waking up. According to an embodiment, the processor 380 may be configured to wake up when receiving a voice signal corresponding to a designated keyword (e.g., "Bixby") or a designated voice command through the microphone 320 in an active state of the microphone 320. As entering the wake-up state, the processor 380 may cause the camera 310 or the head part including the camera 310 to be directed toward the received voice signal, and then receive a voice signal input through the microphone 320 and receive an image captured through the camera 310.

In operation 420, the processor 380 may detect a face based on the received image and perform face tracking based on the first motor control mode. According to various embodiments, the processor 380 may detect a face from the image captured through the camera 330 directed toward the received voice signal, perform control on the motor 330 based on the first motor control mode to cause the camera 310 or the head part including the camera 310 to follow a face moving direction in the image upon detection of the face, and perform face tracking to cause the camera 310 or the head part including the camera 310 to perform photographing along the face. For example, the processor 380 may cause the camera 310 or the head part including the camera 310 to perform photographing along the face based on the first speed by using at least one of the first motor 332, the second motor 334, or the third motor 336. According to various embodiments, the processor 380 may perform voice recognition upon receiving a voice signal during face tracking, and perform face recognition every designated period or designated frame rate from the start of face tracking. For example, the designated period may be a time range of 1 sec, and the designated frame rate may be 30 frames per sec (fps).

In operation 430, the processor 380 may perform voice recognition or face recognition through face tracking based on the second motor control mode in a voice recognition or face recognition period. According to various embodiments, the processor 380 may perform voice recognition while performing face tracking in which at least one of the first motor 332, the second motor 334, or the third motor 336 causes the camera 310 or the head part including the camera 310 to perform photographing along the face based on the second speed being lower than the first speed in a voice recognition period. The processor 380 may perform face recognition while performing face tracking in which at least one of the first motor 332, the second motor 334, or the third motor 336 causes the camera 310 or the head part including the camera 310 to perform photographing along the face based on the second speed being lower than the first speed in a face recognition period.

In operation 440, the processor 380 may determine whether voice recognition or face recognition is successful during face tracking based on the second motor control mode.

In operation 450, the processor 380 may perform voice recognition or face recognition through face tracking based on the third motor control mode, when voice recognition or face recognition fails during face tracking based on the second motor control mode. According to various embodiments, the processor 380 may perform voice recognition while performing face tracking in which at least one of the first motor 332, the second motor 334, or the third motor 336 causes the camera 310 or the head part including the camera 310 to perform photographing along the face based on the third speed being lower than the second speed in a voice recognition period. The processor 380 may perform face recognition while performing face tracking in which at least one of the first motor 332, the second motor 334, or the third motor 336 causes the camera 310 or the head part including the camera 310 to perform photographing along the face based on the third speed being lower than the second speed in a face recognition period.

In operation 460, the processor 380 may determine whether voice recognition or face recognition is successful during face tracking based on the third motor control mode.

In operation 470, the processor 380 may perform a function related to the recognized voice or face, when voice recognition or face recognition is successful during face tracking based on the third motor control mode. For example, when the processor 380 recognizes a user of a specific face as a face recognition result and receives a voice command such as "Turn on the light" as a voice recognition result, the electronic device may perform a function of controlling a lamp among various objects connected to the IoT network to be turned on. For example, the processor 380 may identify the user corresponding to a face recognition result and perform a function of providing information of the identified user to an external server. According to an embodiment, the external server may update user information for which the electronic device is performing face tracking, based on user information received from the electronic device, or obtain information related to the user for which the electronic device is performing face tracking and deliver the obtained information to the electronic device. According to various embodiments, the processor 380 may terminate face tracking when voice recognition or face recognition fails during face tracking based on the third motor control mode. According to another embodiment, when voice recognition or face recognition fails during face tracking based on the third motor control mode, the processor 380 may further attempt voice recognition or face recognition while performing face tracking in which photographing is performed along the face based on a fourth speed that is lower than the third speed.

According to various embodiments, when voice recognition or face recognition is successful during face tracking based on the second motor control mode and voice recognition or face recognition is successful during face tracking based on the third motor control mode, the processor 380 may return to a face tracking mode based on the first motor control mode.

Figure 5A:
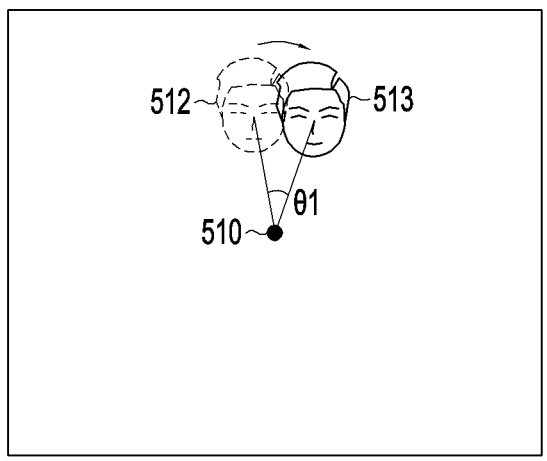
FIGS. 5A through 5C are diagrams for describing face tracking corresponding to each of a first motor control mode through a third motor control mode according to various embodiments.
Figure 5B:
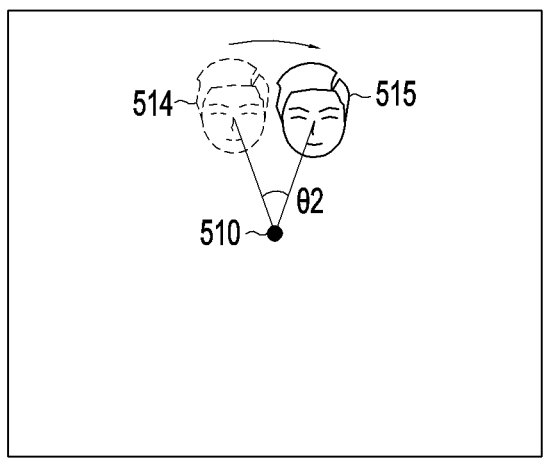
Figure 5C:
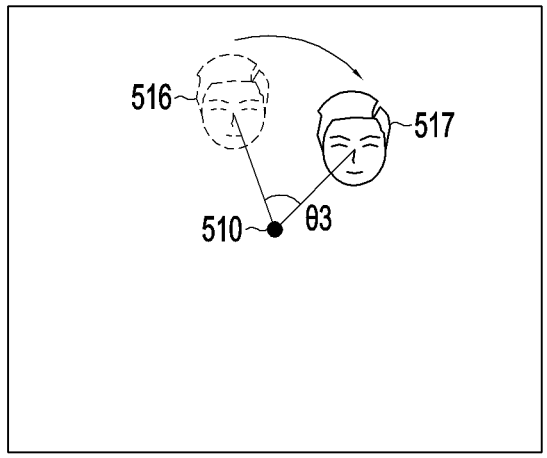

FIGS. 5A through 5C are diagrams for describing the first motor control mode through the third motor control mode according to various embodiments.

Referring to FIGS. 5A through 5C, a processor (e.g., the processor 120 of FIG. 1 or the processor 380 of FIG. 3, which will be hereinafter described using the processor 380 of FIG. 3 as an example) of the electronic device (e.g., the electronic device 100 of FIG. 1, the electronic device 200 of FIGS. 2A and 2B, or the electronic device 300 of FIG. 3) may set the first motor control mode through the third motor control mode based on sensitivity. According to an embodiment, sensitivity may mean a face tracking speed, in which a high face tracking speed means "sensitive" and a low face tracking speed means "insensitive". According to an embodiment, a face tracking speed may be a rotation angular speed based on at least one axis of the camera 310 or the head part including the camera 310 by using each motor.

Referring to FIG. 5A, a processor (e.g., the processor 120 of FIG. 1 or the processor 380 of FIG. 3, which will be hereinafter described using the processor 380 of FIG. 3 as an example) of the electronic device (e.g., the electronic device 100 of FIG. 1, the electronic device 200 of FIGS. 2A and 2B, or the electronic device 300 of FIG. 3) may control the motor 330 based on the first speed corresponding to a first sensitivity in the first motor control mode. According to various embodiments, the first speed may be an angular speed that is set such that the motor 330 rotates the camera 310 with respect to at least one axis by a first angle θ1, when a position moving angle between faces 512 and 513 respectively included in images captured by the camera 310 is the first angle with respect to a center 510. For example, a first angle may be 1 degree. According to an embodiment, at least one of the first motor 332, the second motor 334, or the third motor 336 may rotate the camera 310 or the head part including the camera 310 by 1 degree with respect to each of the pitch axis, the roll axis, and the yaw axis, based on the first speed.

Referring to FIG. 5B, the processor 380 may control the motor 330 based on the second speed corresponding to a second sensitivity in the second motor control mode. According to various embodiments, the second speed may be a speed that is set such that the motor 330 rotates the camera 310 with respect to at least one axis by a second angle θ2, when a position moving angle between faces 514 and 515 respectively included in images captured by the camera 310 is the second angle with respect to the center 510. For example, the second angle may be 3 degrees. According to an embodiment, at least one of the first motor 332, the second motor 334, or the third motor 336 may rotate the camera 310 or the head part including the camera 310 by 3 degrees with respect to each of the pitch axis, the roll axis, and the yaw axis, based on the second speed.

Referring to FIG. 5C, the processor 380 may control the motor 330 based on the third speed corresponding to a third sensitivity in the third motor control mode. According to various embodiments, the third speed may be a speed that is set such that the motor 330 rotates the camera 310 with respect to at least one axis by a third angle θ3, when a position moving angle between faces 516 and 517 respectively included in images captured by the camera 310 is the third angle with respect to the center 510. For example, the third angle may be 5 degrees. According to an embodiment, at least one of the first motor 332, the second motor 334, or the third motor 336 may rotate the camera 310 or the head part including the camera 310 by 5 degrees with respect to each of the pitch axis, the roll axis, and the yaw axis, based on the third speed.

In the first motor control mode, the motor 330 is controlled when the position moving angle between the faces respectively included in the images captured through the camera 310 is the relatively low first angle (e.g., 1 degree), such that the number of times driving the motor 330 increases and thus much noise and vibration may be generated. In the second motor control mode, the motor 330 is controlled when the position moving angle between the faces respectively included in the images captured through the camera 310 is the second angle that is larger than the first angle, such that the number of times driving the motor 330 is less than in the first motor control mode and thus less noise and vibration may be generated than in the first motor control mode. In the third motor control mode, the motor 330 is controlled when the position moving angle between the faces respectively included in the images captured through the camera 310 is the third angle that is larger than the second angle, such that the number of times driving the motor 330 is less than in the second motor control mode and thus less noise and vibration may be generated than in the second motor control mode.

According to various embodiments, the electronic device (e.g., the electronic device 100 of FIG. 1, the electronic device 200 of FIGS. 2A and 2B, or the electronic device 300 of FIG. 3) may perform voice recognition or face recognition through face tracking based on the first motor control mode, may perform voice recognition or face recognition through, in a voice recognition or face recognition period that are sensitive to noise and vibration, face tracking based on the second motor control mode where less noise and vibration are generated than in the first motor control mode, and may perform voice recognition or face recognition through face tracking based on the third motor control mode in which less noise and vibration are generated when voice recognition or face recognition based on the second motor control mode fails, thereby improving the performance of voice recognition or face recognition.

Figure 6:
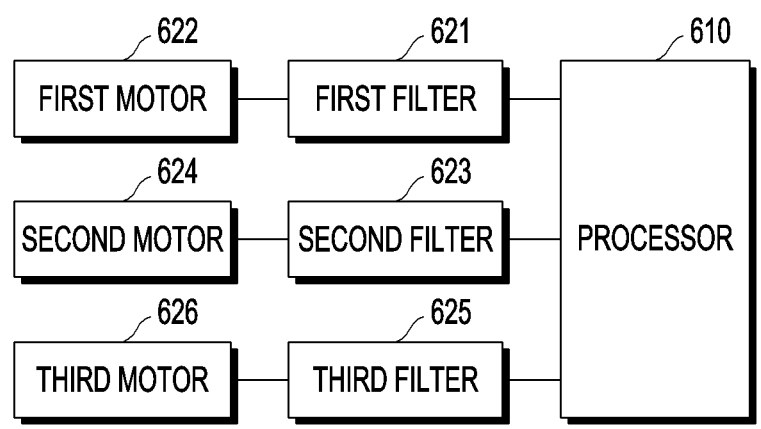
FIG. 6 illustrates a configuration for controlling at least one motor according to various embodiments.

FIG. 6 illustrates a configuration for controlling at least one motor according to various embodiments.

Referring to FIG. 6, the electronic device (e.g., the electronic device 100 of FIG. 1, the electronic device 200 of FIGS. 2A and 2B, or the electronic device 300 of FIG. 3) may include a first filter 621, a second filter 623, and a third filter 625, and a processor 610 (e.g., the processor 120 of FIG. 1 or the processor 380 of FIG. 3) may control each of a first motor 622, a second motor 624, and a third motor 626 by using each of the first filter 621, the second filter 623, and the third filter 625.

According to various embodiments, each of the first filter 621, the second filter 623, and the third filter 625 may include a low pass filter. According to an embodiment, the processor 610 may control each of the first motor 622, the second motor 624, and the third motor 626 by adjusting a cut-off frequency of each of the first filter 621, the second filter 623, and the third filter 625. For example, each cut-off frequency may be a pass frequency of each of the first filter 621, the second filter 623, and the third filter 625.

According to an embodiment, the processor 610 may adjust a cut-off frequency of at least one of the first filter 621, the second filter 623, or the third filter 625 to a first frequency, e.g., 1 hz, in the first motor control mode, thereby controlling the camera 310 or the head part 210 including the camera 310 to rotate by 1 degree with respect to at least one of the pitch axis, the roll axis, or the yaw axis when the position moving angle between the faces included in the images captured by the camera 310 is 1 degree with respect to the center 510.

According to an embodiment, the processor 610 may adjust the cut-off frequency of at least one of the first filter 621, the second filter 623, or the third filter 625 to a second frequency, e.g., 3 hz, in the second motor control mode, thereby controlling the camera 310 or the head part 210 including the camera 310 to rotate by 3 degrees with respect to at least one of the pitch axis, the roll axis, or the yaw axis when the position moving angle between the faces included in the images captured by the camera 310 is 3 degrees with respect to the center 510.

According to an embodiment, the processor 610 may adjust the cut-off frequency of at least one of the first filter 621, the second filter 623, or the third filter 625 to a third frequency, e.g., 5 hz, in the third motor control mode, thereby controlling the camera 310 or the head part 210 including the camera 310 to rotate by 5 degrees with respect to at least one of the pitch axis, the roll axis, or the yaw axis when the position moving angle between the faces included in the images captured by the camera 310 is 5 degrees with respect to the center 510.

Figure 7A:
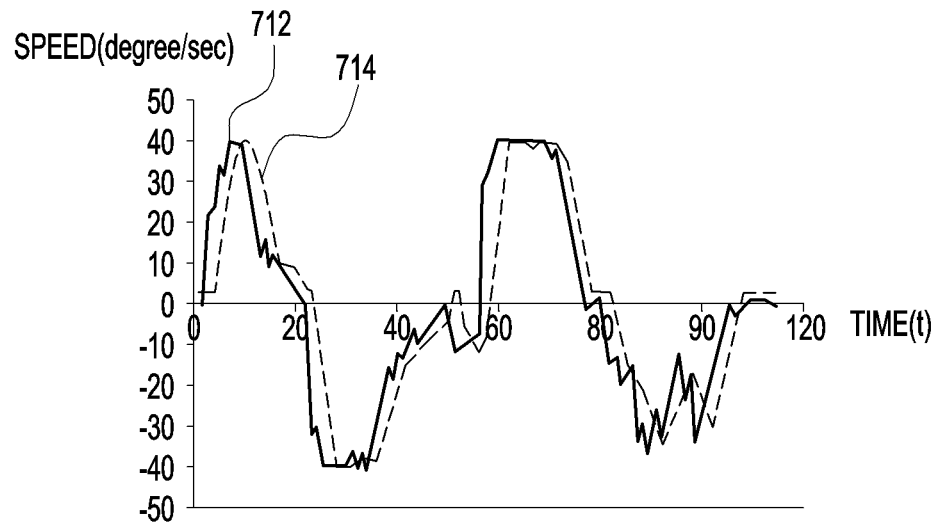
FIGS. 7A through 7C illustrate an actual face moving speed and a face tracking speed for each of a first motor control mode through a third motor control mode according to various embodiments.
Figure 7B:
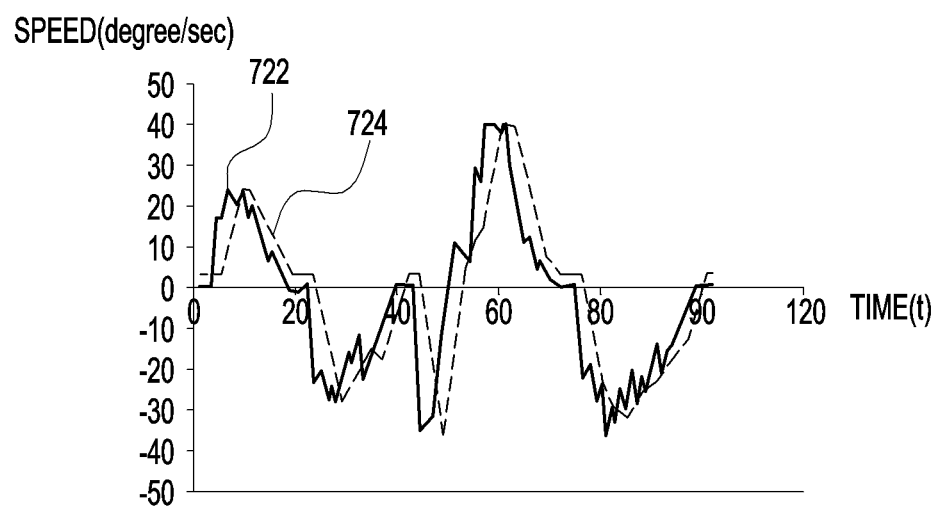
Figure 7C:
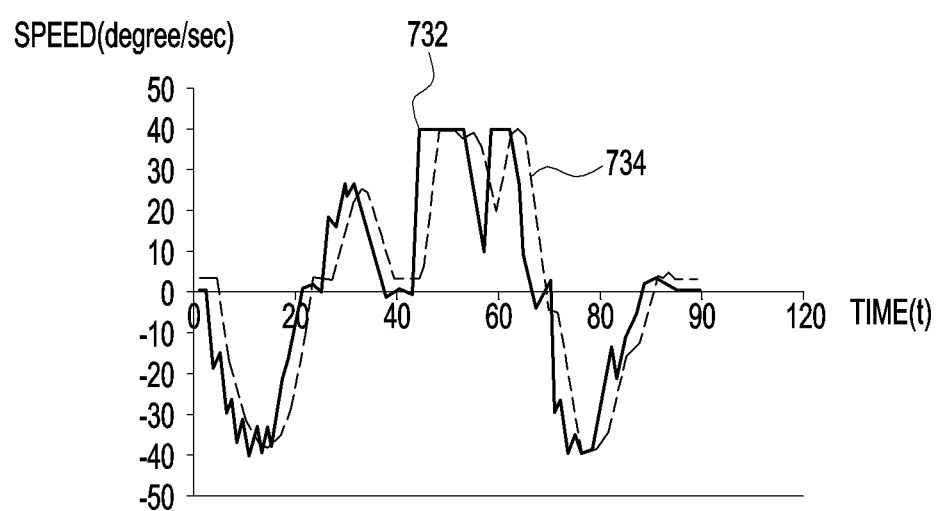

FIGS. 7A through 7C illustrate an actual face moving speed and a face tracking speed for each of a first motor control mode through a third motor control mode according to various embodiments.

Referring to FIG. 7A, a vertical axis may indicate a speed (degree/sec), a horizontal axis may indicate a time (t), and changes of an actual face moving speed 712 and a face tracking speed 714 over time in the first motor control mode are shown. In the first motor control mode, the motor 330 is controlled when the position moving angle between the faces respectively included in the images captured through the camera 310 is the relatively low first angle (e.g., 1 degree), allowing face tracking more closely to the actual face moving speed 712 due to a small difference between the actual face moving speed 712 and the face tracking speed 714, but the number of times driving the motor 330 increases and thus much noise and vibration may be generated.

Referring to FIG. 7B, changes of an actual face moving speed 722 and a face tracking speed 724 over time in the second motor control mode are shown. In the second motor control mode, the motor 330 is controlled when the position moving angle between the faces respectively included in the images captured through the camera 310 is the second angle that is larger than the first angle, causing face tracking to be performed less closely to the actual face moving speed 722 than in the first motor control mode due to a larger difference between the actual face moving speed 722 and the face tracking speed 724 than in the first motor control mode, but the number of times driving the motor 330 is less than in the first motor control mode and thus less noise and vibration may be generated than in the first motor control mode.

Referring to FIG. 7C, changes of an actual face moving speed 732 and a face tracking speed 734 over time in the third motor control mode are shown. In the third motor control mode, the motor 330 is controlled when the position moving angle between the faces respectively included in the images captured through the camera 310 is the third angle that is larger than the second angle, causing face tracking to be performed less closely to the actual face moving speed 732 than in the second motor control mode due to a larger difference between the actual face moving speed 732 and the face tracking speed 734 than in the second motor control mode, but the number of times driving the motor 330 is less than in the second motor control mode and thus less noise and vibration may be generated than in the second motor control mode.

According to various embodiments, the electronic device (e.g., the electronic device 100 of FIG. 1, the electronic device 200 of FIGS. 2A and 2B, or the electronic device 300 of FIG. 3) may perform voice recognition or face recognition through face tracking based on the first motor control mode, may perform voice recognition or face recognition through, in a voice recognition or face recognition period that are sensitive to noise and vibration, face tracking based on the second motor control mode where less noise and vibration are generated than in the first motor control mode, and may perform voice recognition or face recognition through face tracking based on the third motor control mode in which less noise and vibration are generated when voice recognition or face recognition based on the second motor control mode fails, thereby improving the performance of voice recognition or face recognition.

Figure 8A:
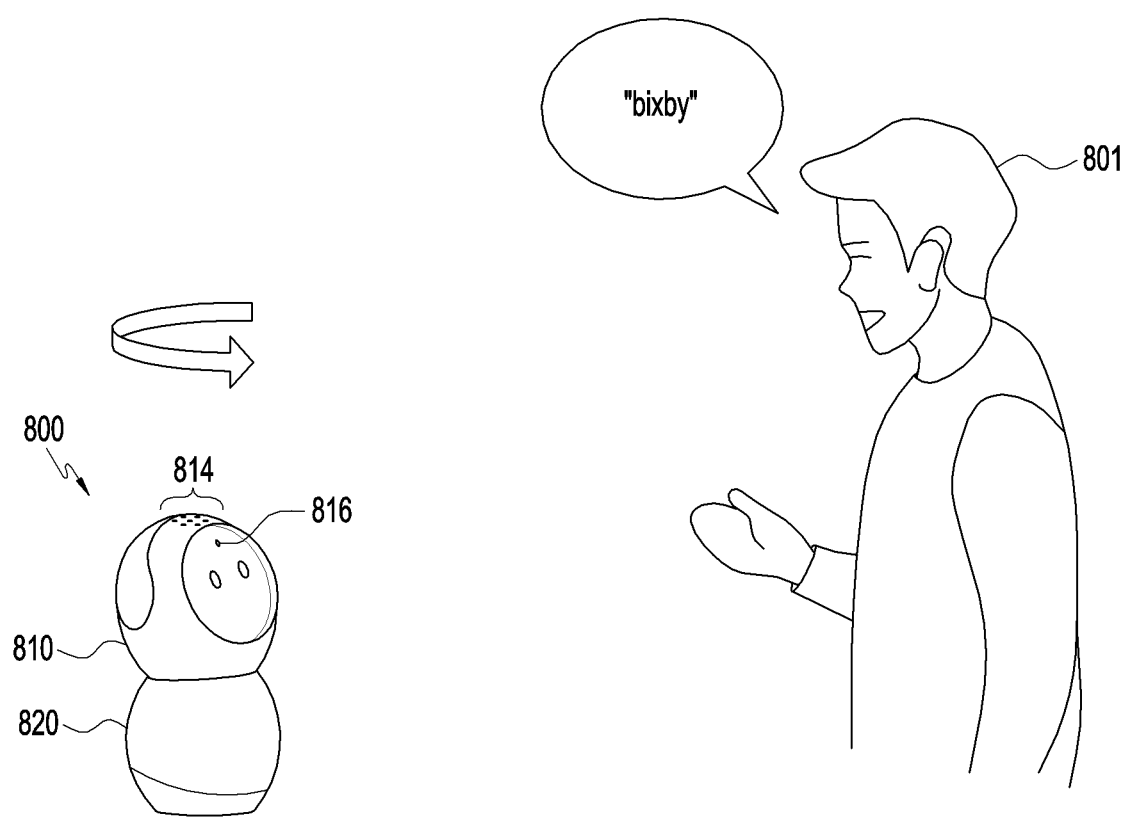
FIGS. 8A through 8C illustrate an example of voice and face recognition performed by an electronic device according to various embodiments.
Figure 8B:
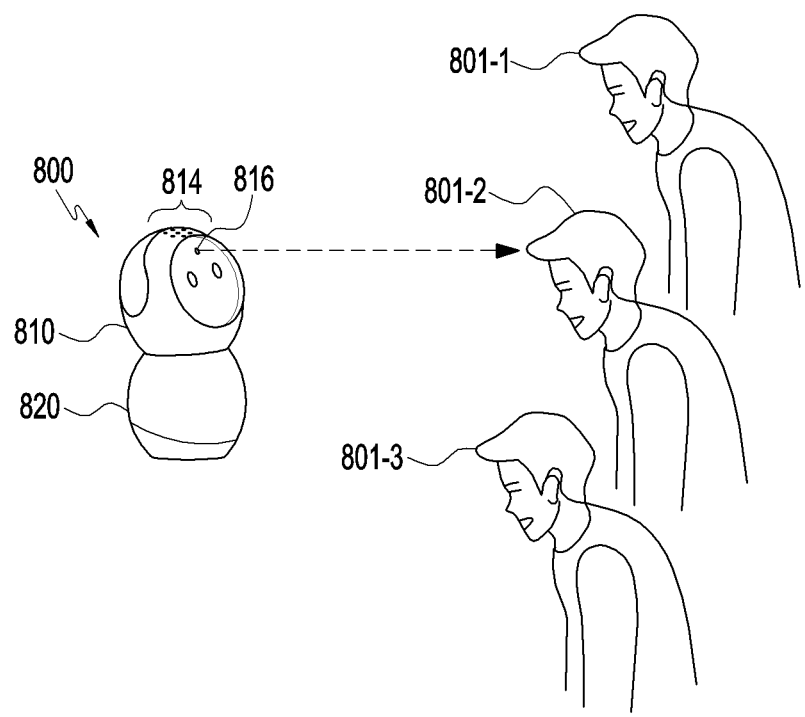
Figure 8C:
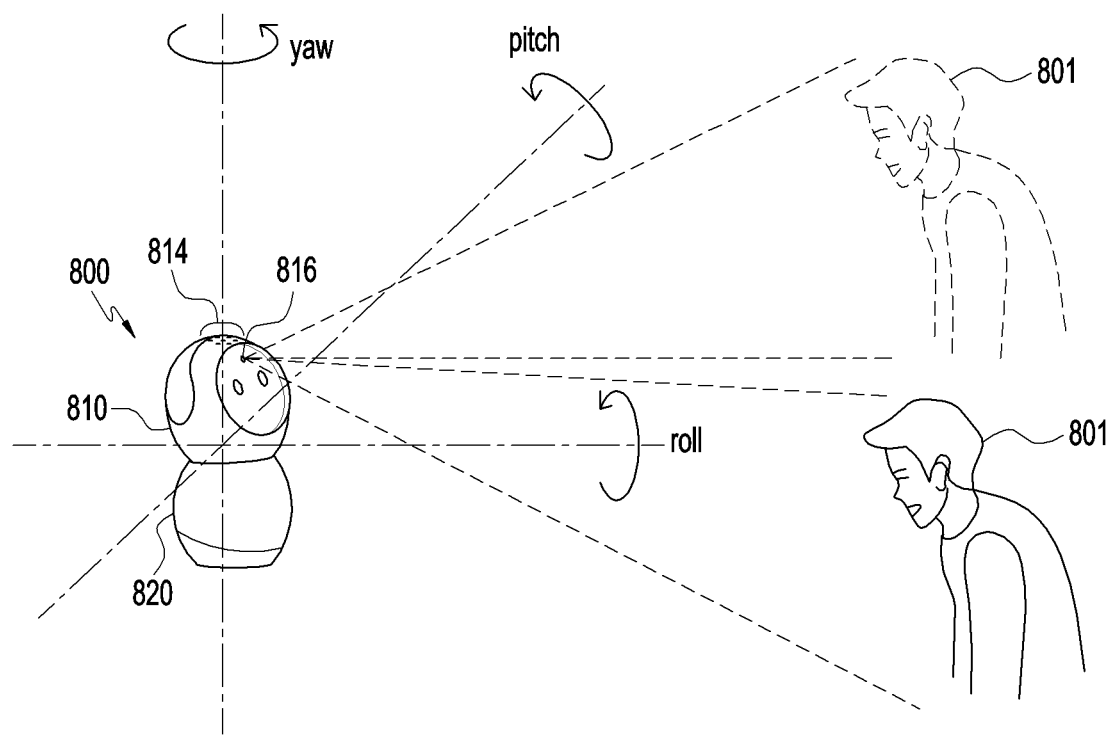

FIGS. 8A through 8C illustrate an example of voice and face recognition performed by an electronic device according to various embodiments.

Referring to FIG. 8A, an electronic device 800 (e.g., the electronic device 100 of FIG. 1, the electronic device 200 of FIGS. 2A and 2B, or the electronic device 300 of FIG. 3) may enter a wake-up state when a designated keyword (e.g., "Bixby") uttered by a user 801 or a voice signal corresponding to a designated voice command is received while the electronic device 800 waits for a voice signal for wakeup in an active state of at least one microphone 814.

As entering the wake-up state, the electronic device 800 may cause a camera 816 or a head part 810 including the camera 816 to be directed toward the received voice signal, and then receive a voice signal input through the at least one microphone 814 and receive an image captured through the camera 816. The electronic device 800 may detect a face of the user 801 based on the image received from the camera 816.

Referring to FIG. 8B, when a plurality of user faces 801-1, 801-2, and 801-3 is detected, the electronic device 800 may perform face tracking based on the first motor control mode with respect to the face 801-2 closest to the center of the image captured by the camera 816.

Referring to FIG. 8C, the electronic device 800 may cause the camera 816 or the head part 810 including the camera 816 to rotate with respect to at least one of the pitch axis, the roll axis, or the yaw axis based on the first speed, such that the camera 816 may perform photographing along a face of the user 801 at the first speed corresponding to the first motor control mode. For example, the first speed may be 200 degrees/sec with respect to the roll axis, 200 degrees/sec with respect to the yaw axis, and 20 degrees/sec with respect to the pitch axis. The first speed may be designated as a speed that is different from each of the aforementioned pitch axis, roll axis, and yaw axis.

According to various embodiments, the electronic device 800 may cause the camera 816 or the head part 810 including the camera 816 to rotate with respect to at least one of the pitch axis, the roll axis, or the yaw axis based on the second speed, such that the camera 816 may perform photographing along a face of the user 801 at the second speed corresponding to the second motor control mode in a voice recognition or face recognition period during face tracking.

According to various embodiments, the electronic device 800 may determine whether voice recognition or face recognition is successful during face tracking based on the second motor control mode. The electronic device 800 may perform voice recognition or face recognition through face tracking based on the third motor control mode, when voice recognition or face recognition fails during face tracking based on the second motor control mode.

According to various embodiments, the electronic device 800 may perform voice recognition or face recognition based on the third motor control mode, while performing face tracking in which the camera 816 or the head part 810 including the camera 816 performs photographing along the face based on the third speed that is lower than the second speed.

The electronic device 800 may perform a function related to the recognized voice or face, when voice recognition or face recognition is successful during face tracking based on the second or third motor control mode. For example, when the electronic device 800 recognizes a user of a specific face as a face recognition result and receives a voice command such as "Turn on the light" as a voice recognition result, the electronic device may perform a function of controlling a lamp among various objects connected to the IoT network to be turned on. For example, the electronic device 800 may identify the user corresponding to a face recognition result and perform a function of providing information of the identified user to an external server. According to an embodiment, the external server may update user information for which the electronic device 800 is performing face tracking, based on user information received from the electronic device 800, or obtain information related to the user for which the electronic device 800 is performing face tracking and deliver the obtained information to the electronic device 800.

According to various embodiments, when voice recognition or face recognition fails during face tracking based on the third motor control mode, the electronic device 800 may further attempt voice recognition or face recognition while performing face tracking in which photographing is performed along the face based on a fourth speed that is lower than the third speed.

Figure 9A:
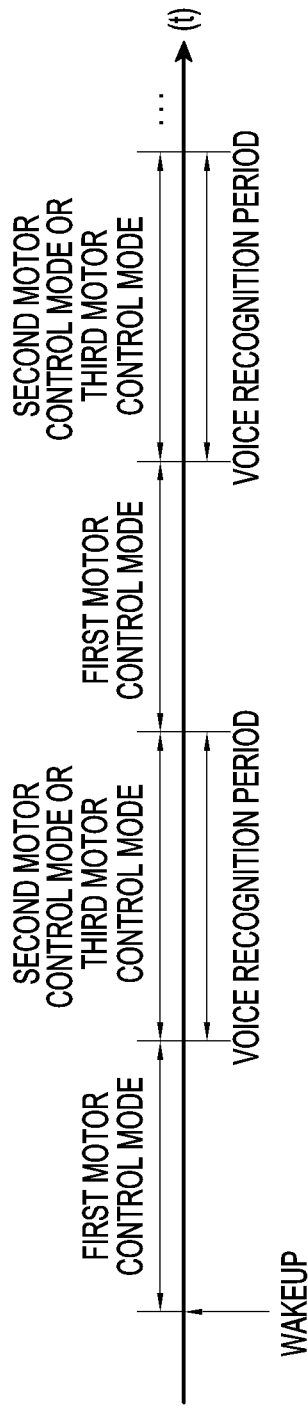
FIGS. 9A and 9B are diagrams for describing a voice recognition period and a face recognition period in an electronic device according to various embodiments.
Figure 9B:
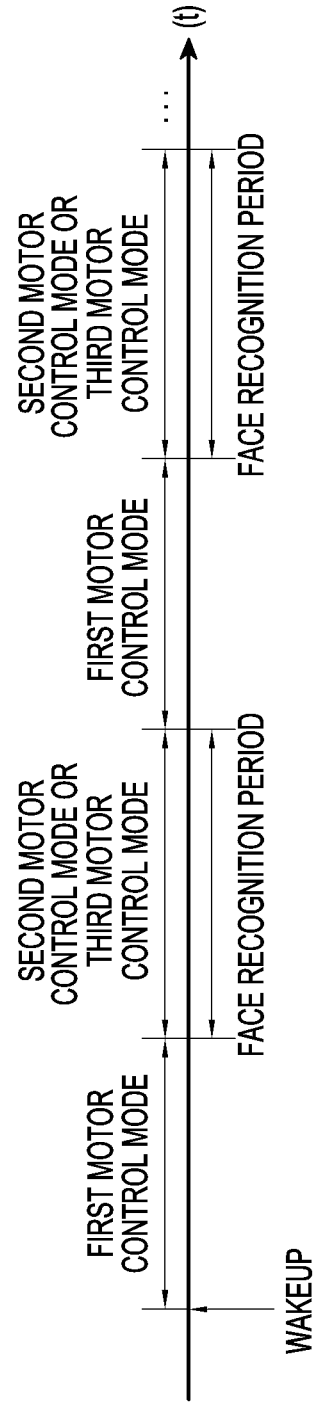

FIGS. 9A and 9B are diagrams for describing a voice recognition period and a face recognition period in an electronic device according to various embodiments.

Referring to FIG. 9A, after waking up, an electronic device (e.g., the electronic device 100 of FIG. 1, the electronic device 200 of FIGS. 2A and 2B, the electronic device 300 of FIG. 3, or the electronic device 800 of FIG. 8) may enter a voice recognition period when a voice recognition period entering condition is satisfied. According to various embodiments, the electronic device 800 may cause the camera 816 or the head part 810 including the camera 816 to be directed toward the voice signal received after waking up, and then enter the voice recognition period, or may enter the voice recognition period immediately after waking up, or may enter the voice recognition period after a designated time from when waking up. The voice recognition period entering condition may be designated as various conditions. The voice recognition period may be a period for identifying information or a command corresponding to the received voice signal. The voice recognition period may be automatically terminated after a designated time from start of the voice recognition period, or when voice recognition is successful or fails. The electronic device 800 may operate based in the second motor control mode or the third motor control mode in a voice recognition period and operate based on the first motor control mode in a period other than the voice recognition period.

Referring to FIG. 9B, after waking up, an electronic device (e.g., the electronic device 100 of FIG. 1, the electronic device 200 of FIGS. 2A and 2B, the electronic device 300 of FIG. 3, or the electronic device 800 of FIG. 8) may enter a face recognition period when a face recognition period entering condition is satisfied. According to various embodiments, the electronic device 800 may cause the camera 816 or the head part 810 including the camera 816 to be directed toward a voice signal received after waking up, and then start face tracking, and enter the face recognition period at the same time with start of face tracking, or may enter the face recognition period every designated time interval during face tracking or may enter the face recognition period in face detection during face tracking. The face recognition period may be a period for identifying a user of a face in the captured image. The face recognition period may be automatically terminated after a designated time from start of the face recognition period, or when face recognition is successful or fails. The electronic device 800 may operate based in the second motor control mode or the third motor control mode in a face recognition period and operate based on the first motor control mode in a period other than the face recognition period.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

According to various embodiments, in a storage medium having stored therein instructions which cause, when executed by at least one circuit, the at least one circuit to perform at least one operation, the at least one operation includes receiving a voice through at least one microphone and an image through a camera, performing first control on at least one motor at least based on a first motor control mode and performing first face tracking using a received image by using the at least one motor at least based on the first control, and performing second control on the at least one motor at least based on a second motor control mode while performing the first face tracking, and performing voice recognition or face recognition by using the at least one motor at least based on the second control.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The above-described electronic device according to various embodiments of the present disclosure is not limited by the above-described embodiments and drawings, and it would be apparent to those of ordinary skill in the art that various substitutions, modifications, and changes in the technical scope of the present disclosure may be possible.

The invention claimed is:
1. An electronic device comprising:
a camera;
at least one microphone;
at least one transceiver;
at least one motor rotating the camera with respect to at least one axis;
at least one processor; and
at least one filter connected between the at least one motor and the processor, wherein the at least one processor is configured to:
receive, via the at least one transceiver, a voice through the at least one microphone and an image through the camera;
adjust a frequency of the at least one filter to a first frequency based on a first motor control mode through the at least one filter, adjust the frequency of the at least one filter to a second frequency based on a second motor control mode, or adjust the frequency of the at least one filter to a third frequency based on to a third motor control mode;
perform first control on the at least one motor based on the first motor control mode and perform first face tracking based on the received image by using the at least one motor based on the first control;
perform second control on the at least one motor based on the second motor control mode while performing the first face tracking;
perform voice recognition based on the received voice or face recognition based on the received image by using the at least one motor at least based on the second control;
perform third control on the at least one motor based on the third motor control mode; and
perform the voice recognition or the face recognition by using the at least one motor based on the third motor control mode, when the voice recognition or the face recognition fails, wherein the at least one motor comprises a first motor, a second motor, and a third motor, and the first motor operates to rotate the camera with respect to a pitch axis, the second motor operates to rotate the camera with respect to a roll axis, and the third motor operates to rotate the camera with respect to a yaw axis.

2. The electronic device of claim 1, wherein the processor is configured to perform the second control on the at least one motor based on the second motor control mode in a voice recognition period or a face recognition period while performing the first face tracking.

3. The electronic device of claim 1, wherein the processor is further configured to perform a function designated in association with a recognized voice or a recognized face, when the voice recognition or the face recognition is successful.

4. The electronic device of claim 1, wherein the processor is configured to perform the first face tracking when a designated voice signal is received through the at least one microphone.

5. The electronic device of claim 1, wherein the processor is configured to perform the first face tracking based on a face that is closer to a center region of the received image among a plurality of faces, when there are the plurality of faces for the first face tracking.

6. The electronic device of claim 1, wherein the first motor control mode comprises a mode in which the at least one motor is configured to rotate the camera at a first speed with respect to at least one axis, the second motor control mode comprises a mode in which the at least one motor is configured to rotate the camera at a second speed with respect to the at least one axis, and the third motor control mode comprises a mode in which the at least one motor is configured to rotate the camera at a third speed with respect to the at least one axis.

7. The electronic device of claim 6, wherein the second speed is lower than the first speed, and the third speed is lower than the second speed.

8. A method for voice recognition or face recognition in an electronic device, the method comprising:

receiving a voice through at least one microphone and an image through a camera;

adjusting a frequency of at least one filter to a first frequency based on a first motor control mode through the at least one filter, adjusting the frequency of the at least one filter to a second frequency based on a second motor control mode, or adjusting the frequency of the at least one filter to a third frequency based on a third motor control mode;

performing first control on at least one motor at least based on the first motor control mode and performing first face tracking using a received image by using the at least one motor at least based on the first control;

performing second control on the at least one motor based on the second motor control mode while performing the first face tracking, and performing voice recognition or face recognition by using the at least one motor at least based on the second control;

performing third control on the at least one motor based on the third motor control mode; and performing the voice recognition or the face recognition by using the at least one motor based on the third motor control mode, when the voice recognition or the face recognition fails, wherein the at least one motor comprises a first motor, a second motor, and a third motor, and the first motor operates to rotate the camera with respect to a pitch axis, the second motor operates to rotate the camera with respect to a roll axis, and the third motor operates to rotate the camera with respect to a yaw axis.

9. The method of claim 8, further comprising:

performing a function designated in association with a recognized voice or a recognized face, when the voice recognition or the face recognition is successful.

10. The method of claim 8, further comprising performing the first face tracking when a designated voice signal is received through the at least one microphone.

11. The method of claim 8, further comprising performing the first face tracking based on a face that is closer to a center region of the received image among a plurality of faces, when there are the plurality of faces for the first face tracking.

* * * * *